United States Patent [19]
Hagerstrom

[11] Patent Number: 5,096,260
[45] Date of Patent: Mar. 17, 1992

[54] CHILD SUPPORT ASSEMBLY

[76] Inventor: Cathleen A. Hagerstrom, 66 West St., Essex Junction, Vt. 05452

[21] Appl. No.: 434,556

[22] Filed: Nov. 13, 1989

Related U.S. Application Data

[63] Continuation-in-part of Ser. No. 267,571, Nov. 7, 1988, abandoned.

[51] Int. Cl.$^5$ ............................................. A47C 1/08
[52] U.S. Cl. ..................................... 297/250; 5/98.1
[58] Field of Search ..................... 297/250, 226, 457; 5/94, 98.1, 122

[56] References Cited

U.S. PATENT DOCUMENTS

| | | | |
|---|---|---|---|
| 1,236,316 | 8/1917 | Kelly | 297/280 |
| 2,542,618 | 2/1951 | Bonet | 5/98.1 |
| 2,695,048 | 11/1954 | Jenner | 5/94 X |
| 2,988,135 | 6/1961 | Caminiti | 5/94 X |
| 4,651,366 | 3/1987 | Lande et al. | 5/94 X |
| 4,717,056 | 6/1988 | Carmichael | 5/98.1 X |

*Primary Examiner*—Jose V. Chen
*Attorney, Agent, or Firm*—Thomas N. Neiman

[57] ABSTRACT

The assembly comprises a plurality of wire attachment frames that slide over the side edges of a shopping cart, or the like, in order to provide support for the assembly and, at the same time, hold the child's head in an elevated position. The frames pass through fabric loops at each end of the support material or cradle bunting and allows support independent of the wire cart seat. By not obstructing the wire cart seat, both the infant and another child may ride simultaneously when using the cradle bunting. The cradle bunting is formed by sewing multi-layered structure. At the longitudinal axis of the upper section of material is a zipper that connects the two segments (flaps) of the top section together in order to provide easy access for removal of the child, prevent the child from accidentally rolling out of the assembly and provide warmth for the infant. Additional fabric loops are provided to allow for flexibility in size adjustments in order to deal with different size carts. Also provided are open and closed loop nylon gripping strips on the bottom side of the lower layer of material that allow for changing of the usable size and depth of the assembly. A safety belt is provided for additional protection and will assist as the assembly is transformed into a toddler restraint when the frame at the foot of the assembly is removed and the frame attachment at the head is placed over the far rim of the shopping cart child seat. The belt can be passed through an aperture at the base of the upper section of material.

5 Claims, 1 Drawing Sheet

CHILD SUPPORT ASSEMBLY

This is a continuation-in-part of my co-pending application Ser. No. 07/267,571 originally filed on Nov. 7, 1988, now abandoned.

This invention pertains to child support devices, and in particular to such shild support assemblies for supporting and restraining infants and toddlers in shopping carts and the like.

The field of support for infants and toddlers is old and has many applications. The most common example is the use of packs to carry infants and toddlers, either on the back with the use of a backpack or a frontal pack, in order to provide warmth, comfort and protection for the child. The use of child seats in vehicles and shopping carts is well known. Examples of these devices include the U.S. Patent issued to Herman Diams, Jr. et al., U.S. Pat. No. 4,324,420 issued on Apr. 13, 1982 for a Infant Carrier Particularly for Grocery Store Carts. This device provides a support in the form of a compact chair like carrier that is positioned in the child seat of a store shopping cart and provides restriction means for the child. Another example of a device which provides support for an infant is the U.S. patent issued to Ellen B. Lande, et al., U. S. Pat. No. 4,651,366 for a Combination Infant Bed and Toddler Seat, issued on Mar. 24, 1987. This device teaches a cradle device that is placed in the child seat of a shopping cart and can be adjusted to seat toddlers as well. The limitations of theses devices are that they are designed to use the shopping cart child seat as a base. For example, the Lande device uses the metal wires of the child seat as a base for the infant carrier and this can cause an uncomfortable situation. Additionally, the space across the shopping cart is fairly limited in size and would limit the amount of time that an infant could use that device. That time would be well before he or she would be able to sit up in the toddler seat.

Clearly, it is desirable for a child support device that does not contain the limitations described above and at the same time is simple and convenient to operate. It is the object of theis invention, then to set forth an improved child support assembly which avoids the disadvantages limitations, above-recited, which obtain in children support devices.

It is also the object of this invention to teach a child support assembly which is simple to install and use and that will enable childern and toddlers of all sizes to use the assembly. It is another object of this invention to teach a child support assembly that allows the parent to easily change the size of the assembly to fit all size shopping carts and all size infants and, at the same time, provide freedom for the adult. Particularly, it is the object of this invention to set forth a child support assembly, for supporting and restraining infants and toddlers in shopping carts and the like, comprising child cradling means; said child cradling means comprising a plurality of fabric layers for supporting and restraining said infant or toddler; said child cradling means having a longitudinal axis; at least one frame means for attaching said child cradling means to said shopping cart; said child cradling means having means for receiving side attaching means; said side attachment receiving means further comprising length adjustment means; said length adjustment means comprising a series of loops positioned perpendicularly to the longitudinal axis of said child cradling means at the opposite axial ends of said child cradling means for replaceable connection to said frame means; restraint means; said restraint means having seat belt restriction means; and position retaining means.

Further objects and features of this inventrion will become more apparent by reference to the following description taken in conjunction with the accompanying figures, in which.

Figure 2:
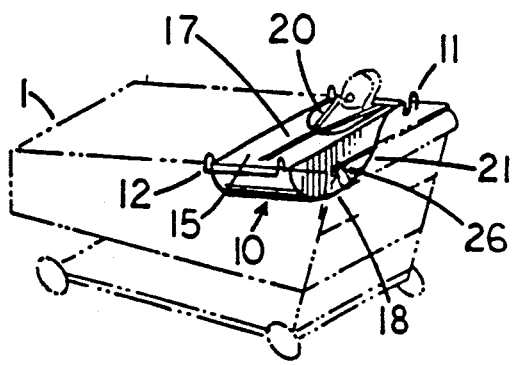
FIG. 2 is a perspective view thereof of the assembly in use in a shopping cart.
Figure 3:
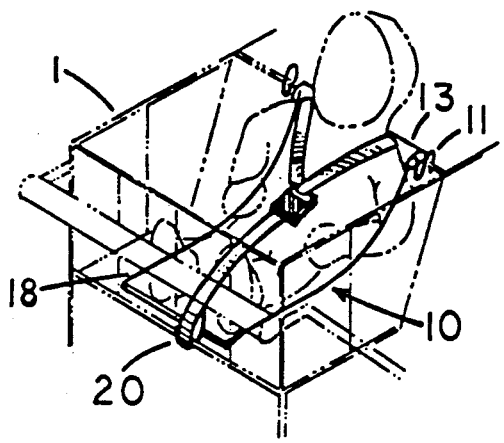
FIG. 3 is a perspective view of the novel assembly in proper position for toddler use.
Figure 4:
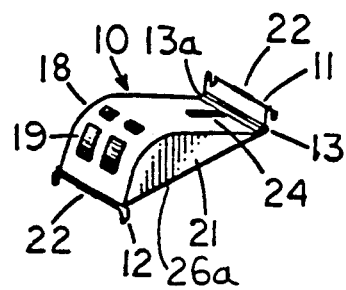
FIG. 4 is a bottom view thereof.
Figure 1:
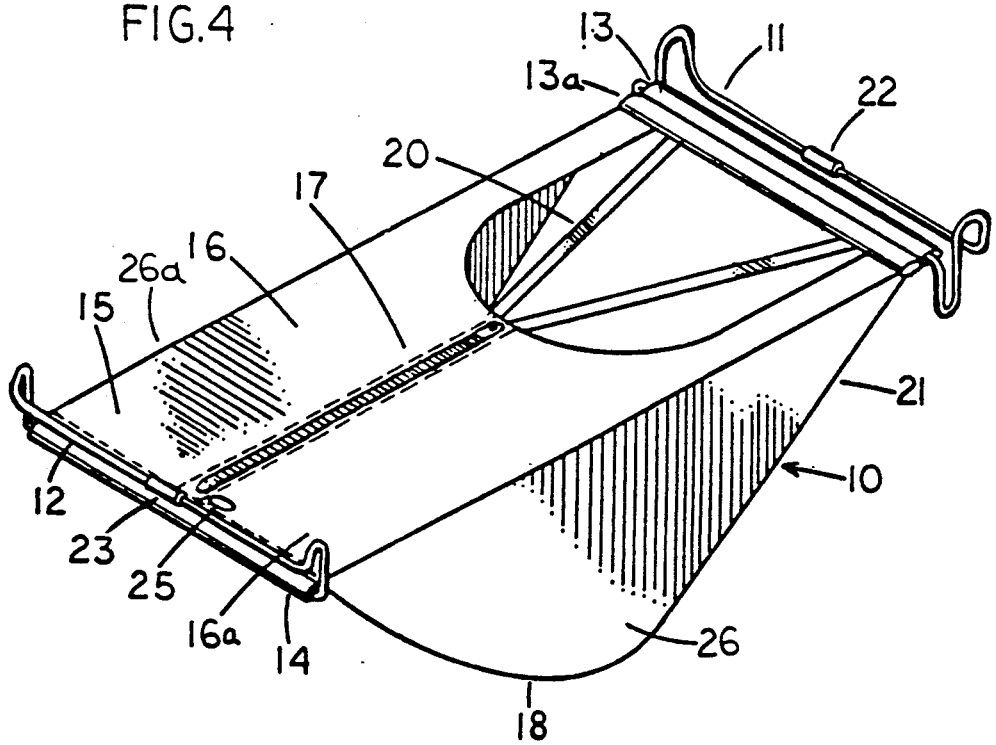
FIG. 1 is a side elevational view of the novel child support assembly.

As shown in the figures, the child support assembly 10 comprises a head frame 11 and a base or foot frame 12. These frames are made from steel rods and are formed by bending them around hardened steel dowels into a series of 90 and 180 degree angles which gives the frames their function. The first two 90 degree bends, each equidistant from their respective wire ends and separated by the width of the fabric seat portion, hold the fabric seat in place for the proper support of the infant. The wire frames together define the shape of the seat by maintaining the tension necessary to keep the infant properly positioned within the seat. From the first 90 degree bends, the head frame descends and makes a 180 degree turn to determine the height of the seat head and prevent the infant's head from resting on the wire cart side. The height also determines the angle of the seat itself which allows longer infants to fit the width of the cart. Seat angle keeps the infant in a natural semi-reclined position with proper back support. Both the contoured shape of the fabric portion and the wire frames cooperatively determine positioning of the infant.

The further result of the 180 degree angle is an ascent of the frame back up serveral inches where a second 180 degree forms a hook shape used for the actual attachment of the support assembly 10 onto the sides of the cart. The ensuing length of wire secures the frame to the cart, finally ending in two opposite 90 degree angles which the wire ends together for joining. Joining the wire ends is accomplished with a tube connection piece 22 and greatly improves the stability of the child support assembly 10. The ability to open and close the connection piece 22, provides for the removal of the frames for making the necessary adjustments for cart size, conversion into a toddler restraint and machine washing of the fabric portion.

The head frame 11 comprises an angled wire hook that fits over the edge of the shopping cart 1. The foot frame 12 fits over the side of the shopping cart opposite the head frame. The length of the assembly 10 can be changed by the placing the head frame 11 through one of the fabric loops 13 and 13a on the head rest side of the cradle bunting 21 by opening the tube connection piece 22 on the head frame 11 and sliding the frame out of one loop and into the other. The foot frame 12 passes through the loop 14 on the opposite end of the cradle bunting 21. The loops 13 and 13a and 14 connect the cradle bunting to the frame 11 and 12. The cradle bunting 21 is made up of a plurality of fabric layers—an upper material section 15 and a curved lower material section 18. The upper material section 15 is made up of twin segments or flaps 16 and 16a that may be connected as a single unit by means of a fastener such as a zipper or VELCRO fastener 17. The lower material section 18 of the cradle bunting 21 is formed of a curved cloth which provides support for the infant's torso and legs. The fabric portion of this assembly is constructed of heavy material suited to the support of the weight of the infant. First, the two halves 16 and 16a are connected by a zipper 17 and this upper piece is then sewn to a long rectangular piece 18 which eventually supports the back and legs of the infant. The curve of the assembly is formed by sewing two curved pieces of fabric 26 and 26a onto the upper portion 15 and lower portion 18 of the assembly. At least one loop 14 is sewn into the rectangular piece 18 at the foot of the assembly and at least two loops 13 and 13a at the top for adjusting the overall length of the seat. Into the seams created by the loops are sewn a safety strap 20. The loops accept the wire frames 11 and 12 which secure the assembly to the sides of the shopping cart.

This section can be adjusted of size by providing more depth and width as necessary for the infants legs by means of VELCRO adjustment strips 19S located on the underside of the lower material section. The depth of the seat defined by the width of the side panels 26 and 26a can also be adjusted for smaller infants by folding the rectangular panel 18 over on itself, lining up the Velcro fasteners and closing them. As the rectangular fabric becomes pleated with the closing of the VELCRO fasteners, the curve of the lower portion of the seat becomes more shallow, reducing the width of the side of the seat and therefore the depth of the support assembly 10. A seat belt system 20 is provided to allow the parent to restrain the child in either the infant position or when the assembly is used in the toddler position when the seat belt can be placed through the aperture 25 at the base of the upper material section. This allows the parent to use the device in the toddler position and still have the zipper pulled up. The seat belt ends are sewn into the seams of the cradle bunting to adequately brace the restraint device. The assembly 10 can be washed by removing frames 11 and 12 by opening tube connectors 22 and 23 and by sliding the frames out of the loops. A position retaining strap 24 that attaches to the shopping cart is sewn into the seam at the bottom of the assembly at the head end to keep the assembly in position.

In operation as an infant bunting, the parent or guardian of the infant would set the proper size of the assembly for the distance between the sides of the shopping cart by placing the frame in the proper loop of the cradle bunting. The assembly is also adjusted in terms of depth of the curved lower section by adjusting the velcro strips located on the underside of the curved lower section. The assembly would the be attached to the sidewalls of the shopping cart at any position in the cart. The infant is then placed inside the cradle bunting and the seat belt can be used, if desired. The twin segments or flaps are then zipped together and the infant is positioned comfortably in a horizontal position with it's head elevated. The shopping cart child seat can be used with a second child as the child support assembly can be positioned at any location in the shopping cart. It should also be noted that the assembly is designed to allow groceries to be placed under the assembly in the cart. In order to use the assembly in the toddler mode, the parent can remove the foot frame and unzip the twin flaps. The head frame can then be placed over the end of the shopping cart's child seat on the rim at the interior side of the cart. The toddler is then placed in the child seat and the seat belt system is coupled. This arrangement provides restraint for youngsters and a sense of relief for the parents.

While I have described my invention in connection with specific embodiments thereof, it is clearly to be understood that this is done only by way of example and as a limitation to the scope of my invention as set forth in the objects thereof and in the appended claims.

I claim:

1. A child support assembly, for supporting and restraining infants and toddlers in shopping carts and the like, comprising:

child cradling means;

said child cradling means comprising a plurality of fabric layers for supporting and restraining said child;

said child cradling means having a longitudinal axis for having said child cradling means reach from one siderail of said shopping cart to the opposite siderail thereof;

a plurality of frame means for attaching said child cradling means to said shopping cart;

said child cradling means having means for receiving side attachment means;

said side attachment receiving means further comprising longitudinal length adjustment means;

said longitudinal length adjustment means comprising a series of parallel loops positioned perpendicularly across the longitudinal axis of said child cradling means at the opposite axial ends of said child cradling means for replaceable connedtion by the insertion of said frame means into said loops;

restraint means;

said restraint means having a seat belt restriction means; and position retaining means.

2. A child support assembly, according to claim 1, wherein:

said fabric layers having an upper material section;

said upper material section having twin segment or flaps;

said upper material section further having replaceable connection means for combining said twin segments into a single unit;

said fabric layers further having a lower material section; and said lower material section comprising a curved bunting means for receiving said child using said assembly.

3. A child support assembly; according to claim 2, wherein:

said curved bunting having first means comprising a rectangular center section, and second means comprising twin curved side panels;

said rectangular center section having an upper side and a bottom side; and said curved bunting further having width adjustment means attached to said bottom side of said rectangular center section.

4. A child support assembly, according to claim 3, wherein:

said width adjustment means comprises a plurality of hook and loop fastener strips positioned on said bottom side of said rectangular center section for permitting the changing of the width of said child support assembly; and said fastener strips comprise alternating parallel hook strips and loop strips for allowing more or less surface area to be available on said rectangular center section depending upon which hook strip is connected with which loop strip.

5. A child support assembly, according to claim 2, wherein:

said replaceable connection means comprises a zipper for permitting separation and reconnection of said twin segments to allow for easy entry and exit into said assembly.

* * * * *